J. W. JOHNSON.
Fanning-Mills.
No. 138,407. Patented April 29, 1873.
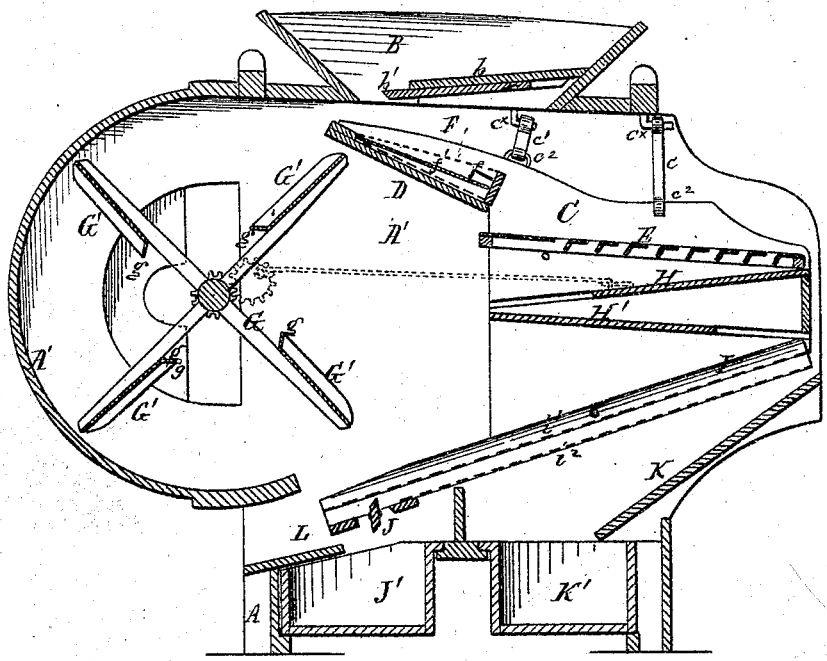
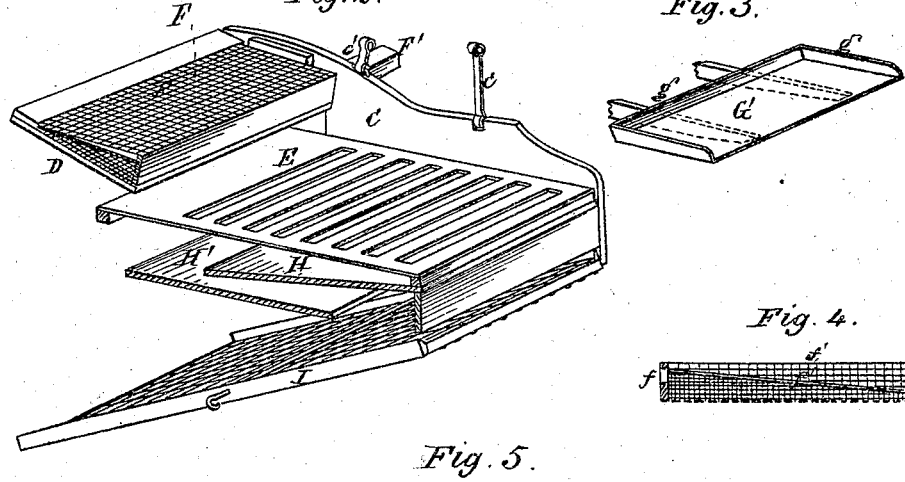
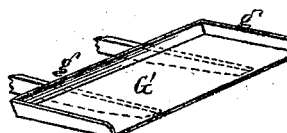
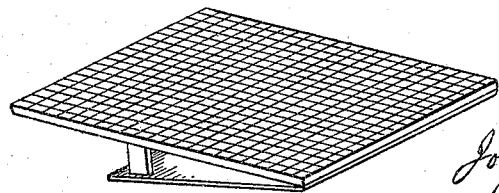
Witnesses
Alex. Mahon
W. Burris
Inventor.
John W. Johnson
by A. M. Smith
Attorney
AM. PHOTO-LITHOGRAPHIC CO. N.Y. (OSBORNE'S PROCESS.)

UNITED STATES PATENT OFFICE.

JOHN W. JOHNSON, OF PORT TREVERTON, PENNSYLVANIA, ASSIGNOR OF TWO-THIRDS OF HIS RIGHT TO IRA SAYRS, OF SAME PLACE.

IMPROVEMENT IN FANNING-MILLS.

Specification forming part of Letters Patent No. 138,407, dated April 29, 1873; application filed March 31, 1873.

*To all whom it may concern:*

Be it known that I, JOHN W. JOHNSON, of Port Treverton, Snyder county, State of Pennsylvania, have invented certain new and useful Improvements in Fanning-Mills, of which the following is a full, clear, and exact description, reference being had to the accompanying drawing, in which—

Figure 1 represents a longitudinal vertical section through my improved fanning-mill. Fig. 2 is a perspective view of the "shoe" detached, with one side board removed for showing the arrangement of its several parts. Fig. 3 is a perspective view of one of the scoop fan-blades. Fig. 4 is a transverse section through the double incline clover and grass seed screen, and Fig. 5 is a perspective view of an ordinary screen or sieve with the inclined delivery or carrying board attached.

Similar letters refer to corresponding parts in all the figures.

My invention consists, first, in a novel construction and arrangement of the several parts of the shoe, as hereinafter described, and to the manner of suspending said shoe, whereby it is adapted to be readily applied to any usual construction of frame and mill; second, in the employment of reversible clover and grass seed-screen attachment, provided with different grades of wire-cloth screen, separated by a double-delivery incline for adapting said screen to separate either clover or grass seed, as hereinafter explained; third, in a novel construction of the receiving screen and carrier, whereby it is provided with a horizontal or inclined upper face-plane for the grain and chaff to pass over, a series of transverse slots extending from side to side of said screen, or nearly so, for permitting the grain to pass through, and a series of downwardly-projecting inclined lips or flanges for deflecting the currents of air from the fan upwardly through said slots for carrying off the chaff, &c., as hereinafter described; fourth, in the employment of a long pivoted double screen, extending from the forward to the delivery end of the mill, adapted to be set at any angle, and provided with a pivoted valve for effecting the more perfect separation of the chaff, shriveled grain, and perfect grain, and for delivering them separately to different receptacles.

In the accompanying drawing, A A' represent the frame and casing which may be of the usual or any approved form and construction; B, the hopper, provided with the inclined bottom $b$ and adjustable slide $b'$ for regulating the feed to the screens; C, one of the side boards of the vibrating shoe. This shoe is suspended from the upper frame timbers by links $c$ $c^1$, two upon each side, the one, $c$, in front being made longer than that, $c^1$, in rear, and both pivoted at their lower ends to the shoe by loops or eyes $c^2$, and at their upper ends these links are provided with eyes, adapting them to be secured to hooks or horizontal arms on pendents $c^x$, as shown, the arrangement of the joints at both ends of the links being such as to permit a lateral vibration of the shoe, and the different lengths of the links, as shown, permitting an increased throw or vibration of the forward end of the shoe. The rear or inner and upper end of the shoe is provided with an inclined board, D, arranged directly under the opening in the bottom of the hopper for conducting the grain, &c., to the screen E. Upon this board D, when the grain contains grass or clover seed which it is desired to separate and save, I place what I call a double-incline sieve, made triangular in form, and provided on one side with a wire-cloth of suitable mesh for passing clover-seed, and on the other with a finer screen adapted to timothy. Between these screens is placed an inclined board arranged at an inclination transversely to the screen, as represented in Fig. 4, crossing the base of the triangular frame in a diagonal line, or one nearly so, and so arranged relative to the openings $f$ in the end board or said double screen that whichever side of the screen is arranged uppermost for operation the inclined middle board $f'$ will serve to conduct the screened grass or clover seed to the outlet opening $f$, whence it escapes through a spout, F', into a suitable receptacle to receive it.

The larger grain and chaff passing over the inclined board D or screen F falls upon the rear or inner end of the screen E, which is made as follows: By preference I use a light rectangular frame covered by sheet metal in which transverse slots are cut extending across, or nearly across, the entire width of the screen, said slots being formed by making a transverse cut or slit through the metal to near the edges, then making a slight cut or nick forward therefrom, and bending the portion of metal thus cut around on three sides, down at an angle of forty-five degrees or more in such manner as to form the slots of sufficient width to permit the heavy grain to fall through, while at the same time providing deflecting lips or flanges, against which the current of air from the fan G will strike and be deflected upward through the openings or slots for carrying off the chaff and preventing its passage through the screen. By this construction of the screen I provide a plane surface, over which the materials operated upon will pass freely, broken only by transverse slots, which effectually prevent the passage of the grain, which is too heavy to be lifted over the slots by the blast of air from the fan. The same form of horizontal plane, downwardly-projecting lips, or flanges, and interposed slots may be secured in a screen made entirely of wood; but I prefer to use the materials named. The chaff is principally removed by the use of this screen, and the grain escaping through said screen is received upon an inclined apron, H, by which it is conveyed inward and deposited upon the inner end of a second incline or apron, H', over which it passes and drops upon the outer or forward end of an inclined double screen, I, extending from the forward or open end of the casing the entire or nearly the entire length of the mill, and having its outlet at or near underneath the fan-case. This screen is composed of longitudinal frame-bars, connected by suitable transverse bars, forming an elongated rectangular frame, which is pivoted at or near midway of its length at $i$ to the sides of the mill frame or casing in such manner that its angle of inclination may be readily varied for varying the time required for the passage of the grain over the same, as character or condition may require, in order to effect a perfect separation. To this adjustable frame is connected an upper wire-screen, $i$, of such number or size of openings as will permit the passage through it of all except full, round, plump grain, which will be carried over its entire length and pass off at its lower end I'. Underneath this, and to the same frame, I attach a second screen, $i^2$, of finer mesh, which receives and retains the smaller or shriveled grains, permitting them to pass off at its lower end through a valve, J, into a receptacle, J'. The smaller seeds which may have remained mixed with the grain when it reaches the screen I, such as cockle and other foreign seeds, which it is desirable to separate therefrom, will readily pass through both screens, $i^1$ $i^2$, and falling upon the incline K will be conducted into receptacle K'.

When for any cause it is not desired to separate the shriveled from the full plump grain the valve J may be closed, and both will escape together at the outlet L into a common receptacle or upon the floor upon which the machine stands.

The fan G may be of the usual construction and operated in the usual manner, except that I make the blades G' in "scoop" form—that is to say, provided on its forward face with curved or angular lips or flanges $g$ on both ends and at its inner or rear edge—this construction enabling me to greatly increase the force or volume of the currents of air thrown off by said blades, inasmuch as said lips or flanges prevent the escape of the air at the sides and rear of the blades in a manner that will be readily understood.

From the description which has been given of the shoe, it will be seen that it is complete in itself, and provided with all the necessary screens, inclined aprons, and when applied to the frame and casing, as described, may be readily detached with its suspending-links $c$ $c'$, and with equal facility applied to any usual construction of frame and casing by first furnishing said frame and casing with suspending-hooks $c^\times$.

The currents of air from the fan G pass under and through the screen E, as explained, and over the faces of the inclined apron H and screen I, and thus acting upon the chaff and lighter particles throughout the entire passage of the grain from the hopper to its delivering-outlet, serves, in connection with the screens, to effectually separate the chaff from the grain, and to cause the latter to be delivered in perfect condition for seed or for market, as may be desired.

Parts of the mill not particularly described may be of any usual or preferred construction.

Having now described my invention, what I claim as new, and desire to secure by Letters Patent, is—

1. The vibrating shoe C provided with the inclines D H H', screens E and I, in combination with the detachable supporting-links $c$ $c'$, all constructed, arranged, and operating substantially as described.

2. The double reversible incline grass and clover seed screen F having the inclined middle board $f'$, arranged and operating substantially as and for the purpose set forth.

3. The screen E having a plane upper face and provided with transverse slots and pendent angular lips or flanges, substantially as and for the purpose set forth.

4. The pivoted long screen I, provided with the finer lower screen $i^2$ and pivoted valve J, constructed, arranged, and operating as and for the purposes described.

JOHN W. JOHNSON.

Witnesses:
J. T. THOMAS,
ALEXR. MAHON.